United States Patent [19]

Wittey

[11] Patent Number: 5,313,137
[45] Date of Patent: May 17, 1994

[54] DISPLAY DEVICES

[76] Inventor: Malcolm G. Wittey, Tamarisk Cottage, Church Road, Penn, Buckinghamshire HP10 8NX, United Kingdom

[21] Appl. No.: 859,393

[22] PCT Filed: Nov. 26, 1990

[86] PCT No.: PCT/GB90/01832
§ 371 Date: May 22, 1992
§ 102(e) Date: May 22, 1992

[87] PCT Pub. No.: WO91/084646
PCT Pub. Date: Jun. 13, 1991

[30] Foreign Application Priority Data

Nov. 30, 1989 [GB] United Kingdom ............... 8927053
Dec. 14, 1989 [GB] United Kingdom ............... 8928264
Jun. 14, 1990 [GB] United Kingdom ............... 9013262

[51] Int. Cl.$^5$ ............................................. H04N 5/74
[52] U.S. Cl. ....................... 313/478; 313/110; 313/113; 359/197; 359/201; 359/212; 359/225; 348/196; 348/205
[58] Field of Search ................ 313/478, 110, 113; 358/60, 62, 63, 199, 208, 231, 237; 359/197, 201, 202, 203, 212, 213, 214, 215, 224, 225

[56] References Cited

U.S. PATENT DOCUMENTS 2,173,476  9/1939  Goldmark ............ 358/237
3,532,425 10/1970  Silverberg ........... 359/215
3,612,642 10/1971  Dostal .
4,931,786  6/1990  Selby ................... 358/63

FOREIGN PATENT DOCUMENTS 0301801  2/1989  European Pat. Off. .
 252387 12/1926  United Kingdom .
 573226 11/1945  United Kingdom .
 922515  4/1963  United Kingdom .
 977927 12/1964  United Kingdom .
1338646 11/1973  United Kingdom .
1440688  6/1976  United Kingdom .
2025724  1/1980  United Kingdom .
2142203  1/1985  United Kingdom .

Primary Examiner—Donald J. Yusko
Assistant Examiner—Nimesh Patel
Attorney, Agent, or Firm—Davis, Bujold & Streck

[57] ABSTRACT

A display system comprises a cathode ray tube (10) including an electron gun (12) for producing a modulated beam of electrons and a mechanism (14, 15) for focusing the beam of electrons and scanning it along a strip (17) of phosphor to produce a linear display. An optical scanning mechanism comprising a vibrating first mirror (26) and a second mirror (30) mounted parallel to the first mirror (26) between which an image of the linear display may be reflected several times, is provided to enable viewing of successive images of the linear display in axially aligned juxtaposed relationship, to produce a two dimensional display.

8 Claims, 1 Drawing Sheet

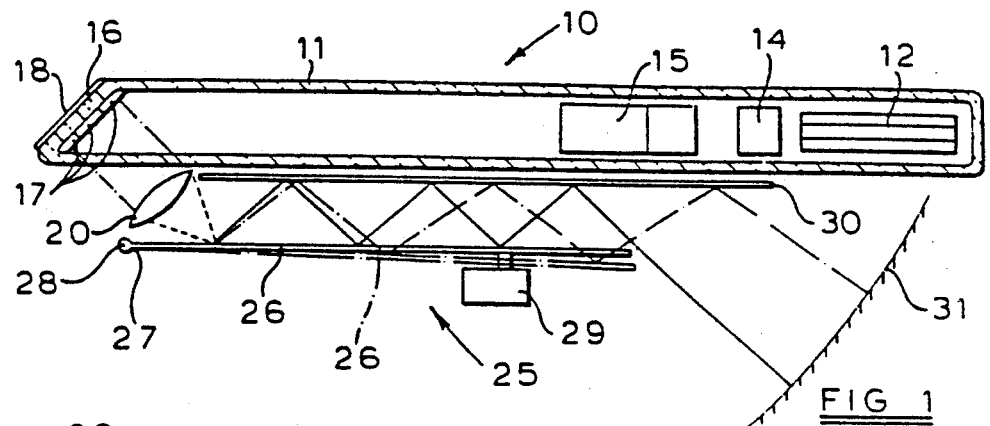
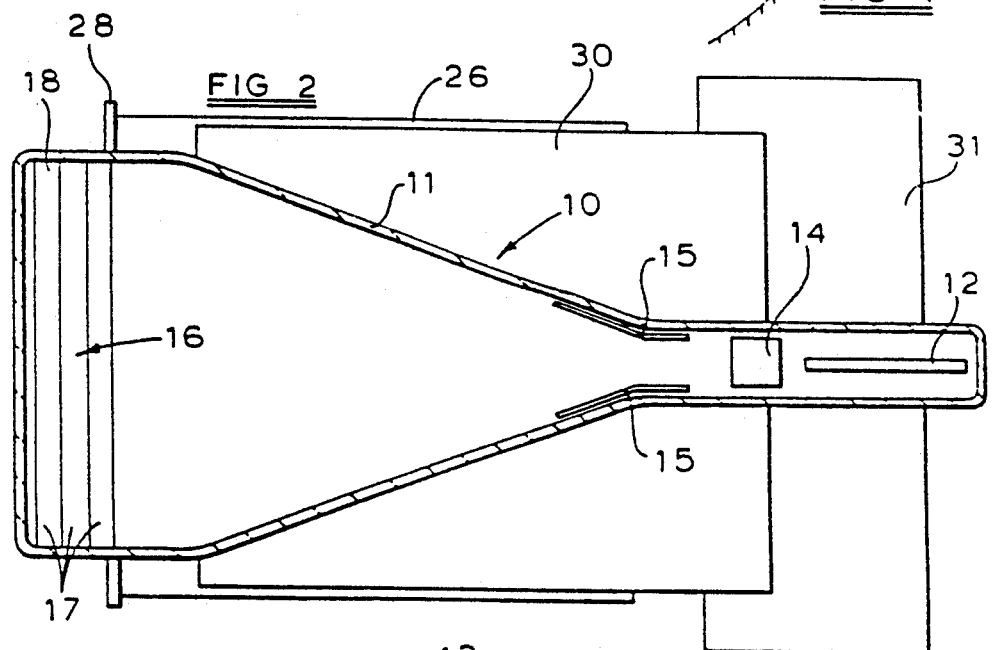
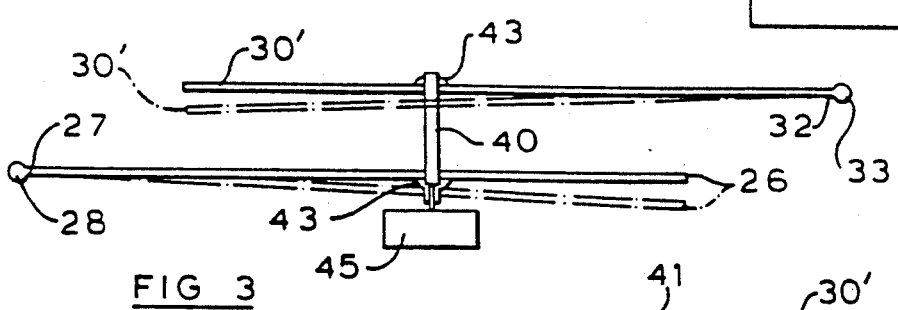
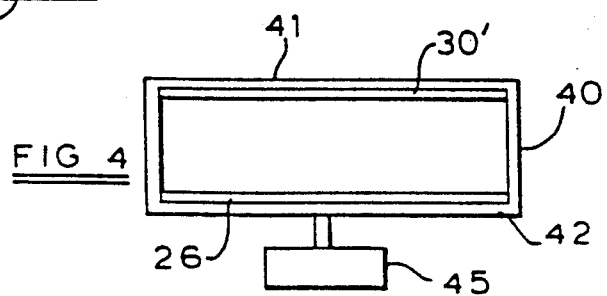

DISPLAY DEVICES

BACKGROUND OF THE INVENTION

The present invention relates to display devices and in particular, to display devices which will produce high resolution displays.

The modern cathode ray tube television receiver with normal sized screen, provides a clear, sharp, bright and flicker-free picture. However, particularly with colour televisions, it is not possible to scale the display down smaller than about five inches, without unacceptable loss of resolution. This problem arises from the cathode ray tube design, in which three guns direct electron beams at an array of triads of phosphor dots (red, green and blue) which are deposited on the inside of the cathode ray tube screen. A shadow mask in the form of a fine mesh or grid is required to ensure that each beam only falls upon and excites the corresponding coloured dot of each triad. There is a limit to the degree to which this system may be reduced in size and hence the only way to reduce the size of the picture beyond that limit is to reduce the number of triads and consequently the resolution.

SUMMARY OF THE INVENTION

The present invention provides a display which will produce a small area high resolution picture. While this invention is particularly advantageous with colour displays, it also applies to monochrome displays.

According to one aspect of the present invention a display device comprises; a cathode ray tube including an electron gun, a strip of phosphor, means for focusing a beam of electrons emitted from the gun onto the strip of phosphor, means for scanning the beam of electrons along the strip of phosphor and means for modulating the beam of electrons emitted from the gun and thus the excitation of the strip of phosphor to provide a linear display; and optical scanning means for viewing successive images of the linear display in axially aligned juxtaposed relationship to produce a two dimensional display, characterised in that the optical scanning means includes a first mirror mounted for planar vibrational movement, a transducer for vibrating the mirror, a second mirror mounted parallel to the first mirror and means for focusing the image of the linear display at an angle onto the first mirror so that it is reflected onto the second mirror and back onto the first mirror.

With the above device, the only limits on resolution in the direction along the strip of phosphor will be the particle size of the phosphor and the focus of the electron beam in that direction, and resolution in the direction transverse to the phosphor will depend on the rate of scanning of the electron beam along the strip of phosphor and the rate of movement of the mirror. Very high resolution small area displays may consequently be produced.

According to a preferred embodiment, three strips of phosphor, one red, one blue and the other green, are provided parallel to one another on the cathode ray tube. Three beams of electrons are scanned across these strips to provide three separate linear displays, which are then combined by optical means and focused on to the first moving mirror to produce a full colour picture. As the image produced by the phosphors is not viewed directly, the strips of phosphor may be spaced relatively widely and consequently there will be no problem in focusing the three electron beams sufficiently to avoid interference. There is therefore no need for a shadow mask and none of the limitations on resolution of the conventional colour television technology will apply.

According to one embodiment of the invention, the second mirror is stationary and as the image of the linear display is reflected from the second mirror angular deflection due to vibration of the first mirror is equal to twice the angular movement of the mirror. Preferably, the mirrors are arranged such that the image will be reflected backwards and forwards several times between the mirrors, before emerging from the optical scanning means, the angular deflection being increased by twice the angular movement of the mirror on each subsequent reflection from the vibrating mirror. Consequently, a very small vibrational angular deflection of the vibrating mirror may be amplified into a significant deflection of the image on leaving the optical scanning means.

Still more powerful amplification of the angular deflection may be achieved by vibrating the second mirror in the opposite direction to the first mirror. With this arrangement, assuming that the deflection of each mirror is equal, the angular deflection of the image of the linear display will be increased by four times the angular movement of the mirror on each reflection from the first mirror.

The transducers used to control vibration of the mirrors may, for example, be a piezoelectric device or moving coil device. Such devices may be controlled by signals of waveform appropriate for the particular application. Means may be included for monitoring the deflection and the driving circuitry may include a closed servo loop, ensuring faithful adherence to the required waveform.

BRIEF DESCRIPTION OF THE DRAWING(S)

The invention is now described, by way of example only, with reference to the accompanying drawings in which:

FIG. 1 illustrates diagrammatically in side elevation a display device in accordance with the present invention;

FIG. 2 illustrates diagrammatically in plan view the display device illustrated in FIG. 1;

FIG. 3 illustrates diagrammatically, in side elevation, a modification to the optical scanning means of the display device illustrated in FIG. 1; and FIG. 4 illustrates in end elevation, the optical scanning means illustrated in FIG. 3.

DESCRIPTION OF THE PREFERRED EMBODIMENTS(S)

As illustrated in FIGS. 1 and 2, the display device has a cathode ray tube 10 comprising an evacuated envelope 11 including a device 12 for producing three electron beams. The device 12 may comprise three electron guns of conventional design which will produce the three beams, each beam being individually modulated by a video signal. Alternatively, the device 12 may be a single electron gun with means to split the beam into three and to modulate each of the split beams individually, with the video signal.

The electron beams pass between an arrangement of electrodes 14 by which the beams may be focused electrostatically and between plates 15 by which the beams may be deflected electrostatically, so that they may be scanned horizontally. The beams of electrons are directed on to a narrow elongate screen 16 defined by the end of the evacuated tube 11. The screen 16 is inclined at 45° to the top and bottom walls of the evacuated tube 11, the outer surface 18 of the portion of the evacuated tube 11 defining the screen 16 being silvered. Three strips 17 of phosphor, one red, one blue and the other green, are deposited on the inner surface of the screen 16, the strips running across the elongate width of the screen 16. A different beam of electrons is focused on to each of the strips 17 and is scanned along the strip 17. The electrons excite the phosphor, so that the strip 17 will produce a linear image, the intensity of the image depending on the modulation of the electron beam. The images produced by the strips 17 correspond to one line of a picture, one image in red, one in blue and the other in green, so that by combining the images a line of a picture in full colour is produced.

The three linear images produced by the cathode ray tube 10 are reflected by the silvered surface 18 through the side wall of the evacuated tube 11 and are combined by means of a lens 20 which is the full width of the screen 16. The combined image is then directed on to optical scanning means 25.

The optical scanning means 25 comprises a first mirror 26 which is hinged about one edge 27. The hinge 28 may be a pivoted joint although as the mirror 26 will only be subject to small angular deflections, a flexible mounting which will accommodate the angular deflection without any relatively moving parts is preferred.

A piezoelectric transducer 29 is connected to the mirror 26 adjacent the edge thereof remote from hinge 28. The transducer 29 is driven by suitable circuitry (not shown) which will produce, for example, a sawtooth waveform, causing the mirror 26 to vibrate through a small angle of say 1°.

A second mirror 30 is mounted parallel to mirror 26, the reflective surface of the mirrors 26 and 30 being opposed to one another. Mirrors 26 and 30 are positioned in juxtaposed relationship to the cathode ray tube 10, the hinged mirror 26 being disposed with respect to the fixed mirror 30 so that the linear images produced by the phosphor strips 17, when reflected by the silvered surface 18 of screen 16 through the side wall of the cathode ray tube 10, will be directed by lens 20 on to the mirror 26 at an angle of 45° at a point adjacent hinge 28. The image from the cathode ray tube 10 will then undergo several reflections between the mirrors 26 and 30 finally being reflected off mirror 30 from which it may be viewed.

In FIG. 1 the trace in full line shows the path of the image from the linear display as it is reflected between the mirrors 26 and 30 when parallel. If mirror 26 is now moved by say 1°, the image is deflected at each reflection from mirror 26 by 2° as shown in broken line.

Vibration of the mirror 26 by means of piezoelectric transducer 29 which is synchronised with the rate at which the phosphor strips 17 are scanned by the electron beams, so that each successive display produced thereby will be viewed at an angularly spaced position thereby building a full two-dimensional picture. This picture may be viewed directly from mirror 26 or may be projected onto a screen 31.

In order to reduce noise or vibration, it is advantageous to modify the frame drive sawtooth waveform used to produce conventional television pictures slightly by rounding its edges and slowing the fastest transition in order to drive mirror 26. This permits movement of the mirror 26 to be smooth and linear in the region where the picture is built up, the cathode ray tube 10 being blank during the periods in which the direction of movement of the mirror 26 is changing.

In order to obtain a further reduction in noise and prevent dirt contaminating the mirror surfaces the scanning means 25 may be enclosed with the cathode ray tube 10 in an evacuated transparent envelope.

In the embodiment of the invention illustrated in FIGS. 3 and 4, mirror 30' is hinged in like manner to mirror 26, but at the opposite end 32. The two mirrors 26 and 30' are interconnected at positions spaced equally from their respective hinges 28, 33 by a rectangular frame 40, each mirror 26, 30' being secured to an opposed side 41, 42 of the rectangular frame 40 by means of a resilient coupling 43. The frame 40 is connected to a piezoelectric transducer 45, by which it may be vibrated.

Upon vibration of the frame 40, both mirrors 26 and 30' will be caused to vibrate about their respective hinges 28 and 33 but as the hinges 28 and 33 are at opposite ends of the mirrors 26 and 30', the mirrors 26 and 30' will rotate in opposite directions. With this embodiment as the mirrors 26 and 30' vibrate, deflection of the images passing through the scanning means 25 relative to the input beam will be increased on each reflection from each of the mirrors 26 and 30', by twice the angular movement of the mirrors.

Typically, line images will be produced by the cathode ray tube 10 at 64 $\mu$s. intervals. The mirror 26 will typically be vibrated at 50 Hz producing a picture with 312.5 lines at 50 fields per second which when alternate fields are interlaced produces a picture of 625 lines at 25 frames per second.

It will be appreciated that compared with conventional television technology, phosphors with relatively short persistence characteristics are used, so that successive linear displays may be produced at 64 $\mu$s intervals, without one linear display interfering with the next.

While the electron beams must be focused finely longitudinally of strips 17, focusing of the electron beams transverse to the strips 17 of phosphor is important only in so far as the beam is restricted to one specific strip 17 and does not overlap on to the other strips 17. A sharply focused image of the linear display may be achieved by the optical focusing means 20, after the linear display has been formed. It is in fact advantageous to have relatively broad strips 17 of phosphor and utilise beams of electrons which are diffuse transverse to the strips 17, so that upon optical focusing the brightness of the image will be enhanced. Consequently, a lower powered beam of electrons may be used thus reducing the voltages required and the likelihood of burning of the phosphors.

The system described above is suitable for producing very small displays, typically 25 mm square, which may be of very high resolution. Such displays may be used to view conventional television signals or compatible computer generated output.

The display may be used in the form of a hand held television receiver or visual display unit.

Alternatively, smaller displays may be mounted on suitable support means, for example spectacle frames or a support helmet, for location adjacent the viewer's eye. Such displays may also be used as the viewfinder of a camcorder or similar device. Miniature displays may also be provided for each of the viewer's eyes so that three dimensional images may be viewed. Such systems may be combined with personal stereo audio systems. Furthermore, a head motion sensor could be used to control the pictures displayed, so that movement of the head would affect the viewpoint of the displayed picture. Such systems may be used for entertainment purposes or in realistic simulators for driving or flying etc. Alternatively, the display may be used as a projector, suitable optical means being provided for projecting the image onto a remote screen.

Various modifications may be made without departing from the invention. For example while in the embodiment described above, piezoelectric devices are used to vibrate the mirrors 26, 30', other means, for example a moving coil device may be used for this purpose. A Hall effect device will preferably be mounted on the moving coil to sense the position relative to the magnet and provide a feedback arrangement to ensure adherence to the sawtooth waveform.

While it is preferred to vibrate mirrors 26 and 30' so that they are deflected angularly about a fixed pivot, the vibration may alternatively be parallel, the varying separation of the mirrors producing a lateral shift in the reflected beam which is amplified on each reflection.

I claim:

1. A display system comprising a cathode ray tube including an electron gun, a strip of phosphor, means for focusing a beam of electrons emitted from the gun onto the strip of phosphor, means for scanning the beam of electrons along the strip of phosphor and means for modulating the beam of electrons emitted from the gun and thus the excitation of the strip of phosphor to provide a linear display; and optical scanning means for viewing successive images of the linear display in axially aligned juxtaposed relationship, to produce a two dimensional display, the optical scanning means including first and second mirrors mounted for angular vibrational movement about parallel axes defined by opposite edges of each mirror, the mirrors being interconnected at positions equally spaced from their pivotal axes, so that angular vibrational movement of one mirror will be transmitted to the other mirror but movement of one mirror will be in the opposite angular direction to that of the other mirror, a transducer being provided to vibrate the mirrors, and means for focusing the image of the linear display at an angle onto the first mirror so that it is reflected onto the second mirror and back onto the first mirror.

2. A display device according to claim 1 in which the mirrors are arranged such that the image of the linear display will be reflected between the first and second mirrors a plurality of times.

3. A display device according to claim 1 in which the mirrors are vibrated by one of a piezoelectric transducer and a moving coil device.

4. A display device according to claim 1 in which the cathode ray tube has an inclined screen, said screen being silvered on the outside of the cathode ray tube so that the image produced on the screen is reflected through the wall of the cathode ray tube, the mirrors of the optical scanning means being arranged in juxtaposed position to the cathode ray tube so that the image reflected from the screen of the cathode ray tube is directed onto the first mirror at an angle.

5. A display device according to claim 4 in which the angle at which the image of the linear display is reflected onto the first mirror is 45°.

6. A display system according to claim 5 in which a lens is provided for focusing the image of the linear display onto the first mirror.

7. A display device according to claim 1 in which means is provided for monitoring movement of the mirrors to provide a feedback arrangement to ensure that the mirrors adhere to a predetermined vibrational motion.

8. A display device according to claim 1 in which three parallel strips (17) of phosphor are provided, one producing a red image, one a blue image and the third a green image, means (12) being provided to produce separate electron beams to scan each of the phosphorus strips (17), and means (20) being provided to combine the three images to produce a linear colour display.

* * * * *